US007882208B2

(12) United States Patent
Akashika et al.

(10) Patent No.: US 7,882,208 B2
(45) Date of Patent: Feb. 1, 2011

(54) INFORMATION MANAGEMENT APPARATUS, INFORMATION MANAGEMENT METHOD, AND PROGRAM FOR MANAGING AN INTEGRATED CIRCUIT

(75) Inventors: Hideki Akashika, Tokyo (JP); Jun Ogishima, Tokyo (JP); Naofumi Hanaki, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 333 days.

(21) Appl. No.: 11/231,873

(22) Filed: Sep. 22, 2005

(65) Prior Publication Data

US 2006/0101136 A1 May 11, 2006

(30) Foreign Application Priority Data

Sep. 30, 2004 (JP) ............................. 2004-285950

(51) Int. Cl.
*G06F 15/173* (2006.01)
*G06F 21/00* (2006.01)
(52) U.S. Cl. ..................... 709/223; 709/206; 709/225; 713/150; 713/155; 713/168; 713/182; 713/183; 713/184; 713/189; 713/190; 726/4; 726/26; 710/11; 235/380; 235/381; 235/382; 380/28; 380/29; 380/30; 380/42; 380/43
(58) Field of Classification Search .................. 709/223
See application file for complete search history.

(56) References Cited

U.S. PATENT DOCUMENTS

| | | | | |
|---|---|---|---|---|
| 5,150,407 A | * | 9/1992 | Chan | 713/178 |
| 5,533,123 A | * | 7/1996 | Force et al. | 713/189 |
| 5,959,276 A | * | 9/1999 | Iijima | 235/380 |
| 6,279,047 B1 | * | 8/2001 | Bublitz et al. | 710/11 |
| 6,282,653 B1 | * | 8/2001 | Berstis et al. | 726/26 |
| 6,575,360 B1 | * | 6/2003 | Hagn | 235/380 |

(Continued)

FOREIGN PATENT DOCUMENTS

JP 10-040099 2/1998

(Continued)

OTHER PUBLICATIONS

IBM Technical Disclosure Bulletin NNRD41993 'Secure Authentication for Remote Client Management'.*

(Continued)

*Primary Examiner*—Henry W Tsai
*Assistant Examiner*—Steven G Snyder
(74) *Attorney, Agent, or Firm*—Rader, Fishman & Grauer PLLC

(57) ABSTRACT

An information management apparatus includes a management unit for managing the type of integrated circuit chip and the type of command to be executed by the integrated circuit chip in such a manner as to correspond to each other; an information obtaining unit for obtaining information on the type of the integrated circuit chip to be controlled; and a command generation unit for generating a command of the type corresponding to the type of the integrated circuit chip to be controlled, the type of the integrated circuit chip being obtained by the information obtaining unit, from among a plurality of different types of commands corresponding to the command requested from a server and for transmitting the generated command to the server.

13 Claims, 14 Drawing Sheets

U.S. PATENT DOCUMENTS

| | | | |
|---|---|---|---|
| 6,697,489 B1* | 2/2004 | Candelore | 380/200 |
| 7,242,768 B2* | 7/2007 | Challener | 380/44 |
| 7,366,913 B1* | 4/2008 | Haley | 713/189 |
| 7,716,483 B2* | 5/2010 | Sozzani et al. | 713/171 |
| 2002/0032858 A1* | 3/2002 | Nakano et al. | 713/159 |
| 2002/0129261 A1* | 9/2002 | Cromer et al. | 713/193 |
| 2002/0174336 A1* | 11/2002 | Sakakibara et al. | 713/172 |
| 2002/0194138 A1* | 12/2002 | Dominguez et al. | 705/64 |
| 2004/0024817 A1* | 2/2004 | Pinkas | 709/203 |
| 2004/0199764 A1* | 10/2004 | Koechling et al. | 713/155 |
| 2004/0250126 A1* | 12/2004 | Buer et al. | 713/201 |
| 2005/0108518 A1* | 5/2005 | Pandya | 713/151 |
| 2005/0195975 A1* | 9/2005 | Kawakita | 380/30 |
| 2006/0118614 A1* | 6/2006 | Rose | 235/380 |
| 2006/0155992 A1* | 7/2006 | Omori et al. | 713/169 |
| 2007/0183194 A1* | 8/2007 | Devadas et al. | 365/185.03 |

FOREIGN PATENT DOCUMENTS

| | | |
|---|---|---|
| JP | 11-282982 | 10/1999 |
| JP | 2000-172798 | 6/2000 |
| JP | 2000-353216 | 12/2000 |
| JP | 2001-223631 | 8/2001 |
| JP | 2004-153711 | 5/2004 |
| JP | 2004-264921 | 9/2004 |

OTHER PUBLICATIONS

The Hidden Costs of Client/Server' by Shaku Atre, DBMS, Jun. 1995.*

Japanese Office Action dated Dec. 25, 2007 for corresponding Japanese Application No. 2004-285950.

Japanese Office Action issued Dec. 25, 2008 for corresponding Japanese Application No. 2004-285950.

* cited by examiner

DIRECTORY STRUCTURE

FIG. 11

| CHIP TYPE | COMMAND TYPE | ENCRYPTION PROCESSING TYPE |
|---|---|---|
| FeliCa1 | Type11 | Type12 |
| FeliCa2 | Type12 | Type12 |
| GP1 | Type21 | Type21 |
| GP2 | Type22 | Type21 |

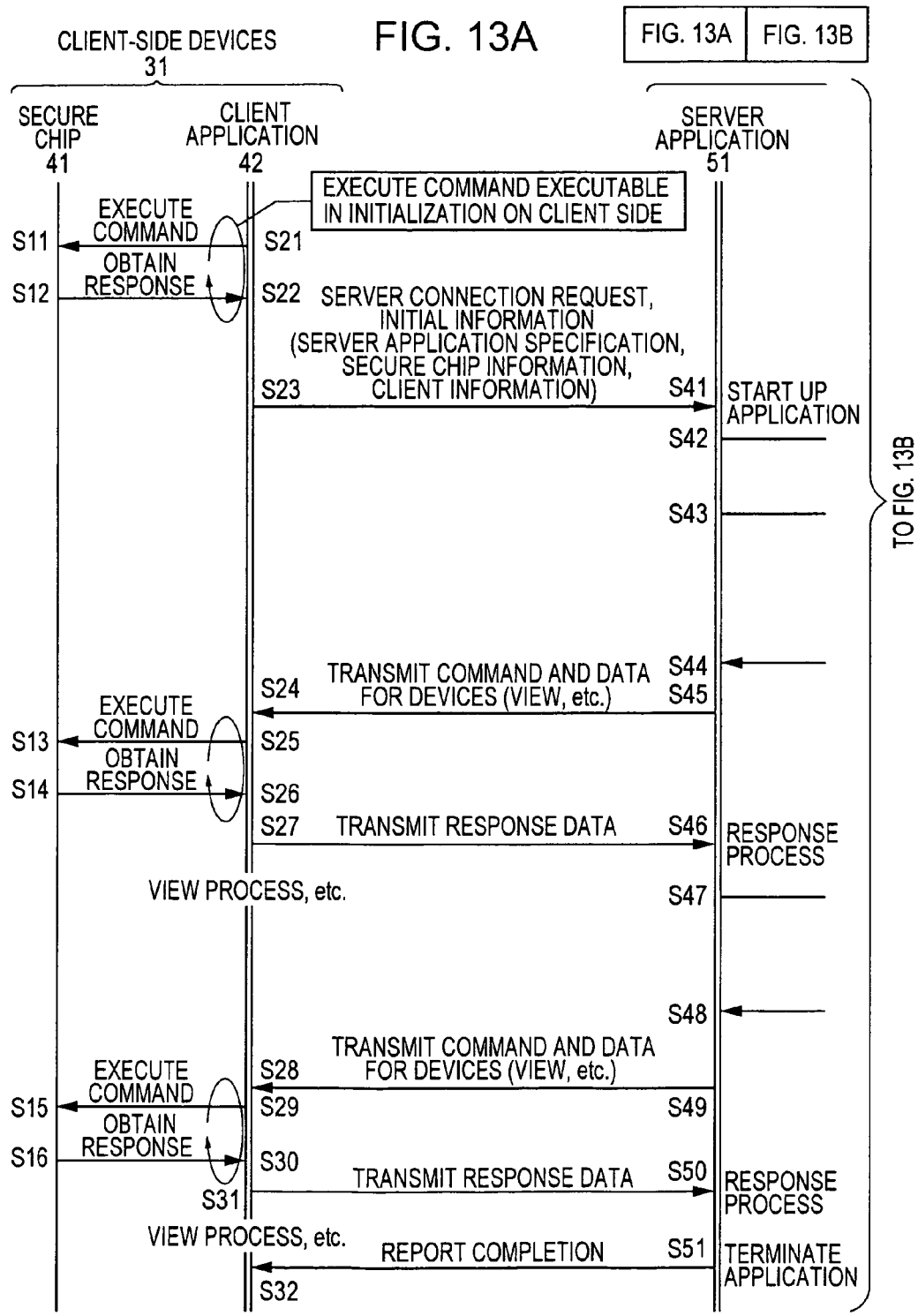

INFORMATION MANAGEMENT APPARATUS, INFORMATION MANAGEMENT METHOD, AND PROGRAM FOR MANAGING AN INTEGRATED CIRCUIT

CROSS REFERENCES TO RELATED APPLICATIONS

The present invention contains subject matter related to Japanese Patent Application JP 2004-285950 filed in the Japanese Patent Office on Sep. 30, 2004, the entire contents of which are incorporated herein by reference.

BACKGROUND OF THE INVENTION

1. Field of the Invention

The present invention relates to an information management apparatus, an information management method, and a program. More particularly, the present invention relates to an information management apparatus capable of generating commands corresponding to a plurality of different types of IC chips in response to a request from one server, an information management method for use therewith, and a program for use therewith.

2. Description of the Related Art

In recent years, it has been getting popular that electronic money is charged (deposited) in a non-contact IC chip, such as a credit card or FeliCa (registered trademark) embedded in a cellular phone and that the price when a commodity is purchased is paid using the charged electronic money.

When the price is paid, it is only necessary to hold the user's credit card or cellular phone up to a terminal (reader/writer) disposed in a shop. Thus, it is possible for the user to quickly pay the price.

Such an electronic money system is configured, for example, as shown in FIG. 1.

A server side of the electronic money system includes a server device 1 and a SAM (Secure Application Module) 2. A client side of the electronic money system includes a client device 3 and an R/W (reader/writer) 4. The server device 1 and the client device 3 are connected to each other via a network 5.

In the example of FIG. 1, a cellular phone 6, in which a non-contact IC chip 13 is incorporated, is positioned close to the R/W 4 on the client side, and the cellular phone 6 is connected to the client device 3 through short-distance communication using electromagnetic induction.

A server application 11 implemented in the server device 1 performs communication with a client application 12 implemented in the client device 3, and outputs, to the SAM 2, a command (command executed by the non-contact IC chip 13) generated in response to a request from the client application 12. When the command on which encryption is performed is supplied from the SAM 2, the server application 11 transmits it to the client application 12 of the client device 3 via the network 5.

The SAM 2 is a tamper-resistant device, and manages encryption processing and keys used in the encryption processing. The SAM 2 performs encryption on the command supplied from the server application 11, and outputs the encrypted command to the server application 11. The SAM 2 and the non-contact IC chip 13 each have a common key, and encryption communication is realized between the SAM 2 and the non-contact IC chip 13 by transmitting and receiving the encrypted information using the key.

The client application 12 of the client device 3 transmits a predetermined request to the server application 11 of the server device 1. Also, when a command is transmitted from the server application 11, the client application 12 transmits it to the non-contact IC chip 13 via the R/W 4 so that the command is executed by the non-contact IC chip 13.

The non-contact IC chip 13 decrypts the encryption performed on the command transmitted from the SAM 2 via the R/W 4, etc., and executes it. When the content of the command is the rewriting of electronic money, this command contains, for example, information of the amount of money to be rewritten.

For example, in the electronic money system having such a configuration, when the user of the cellular phone 6 pays the price of the purchased commodity by using the electronic money stored in the non-contact IC chip 13, the client application 12 of the client device 3 transmits a request for paying the price of the commodity to the server application 11 of the server device 1. The server application 11 receiving the request generates a command (read command) for requesting the non-contact IC chip 13 to read the balance of the electronic money.

The read command generated by the server application 11 is subjected to encryption by the SAM 2, and thereafter, the read command is transmitted to the non-contact IC chip 13 via the server application 11 of the server device 1, the network 5, the client application 12 of the client device 3, and the R/W 4. After the read command is decrypted by the non-contact IC chip 13, it is executed. The balance that is read as a result of the read command being executed is subjected to encryption by the non-contact IC chip 13. Thereafter, the balance is transmitted as a response for the server application 11 to the SAM 2 via the R/W 4, the client application 12 of the client device 3, the network 5, and the server application 11 of the server device 1. In the SAM 2, the encryption performed on the balance transmitted from the non-contact IC chip 13 is decrypted, and the decrypted balance is transmitted to the server application 11.

As a result, the server application 11 is able to confirm the current balance of the electronic money, which is stored in the non-contact IC chip 13.

When the balance is confirmed, the server application 11 of the server device 1 generates a command (write command) for requesting the non-contact IC chip 13 to rewrite the balance of the electronic money (rewriting to the balance that is subtracted by the amount of the price of the commodity).

Similarly to the read command that was transmitted previously, the write command generated by the server application 11 is subjected to encryption by the SAM 2. Thereafter, the write command is transmitted to the non-contact IC chip 13 via the server application 11 of the server device 1, the network 5, the client application 12 of the client device 3, and the R/W 4. The write command is decrypted in the non-contact IC chip 13, and then it is executed. This write command also contains information indicating how much the balance should be. As a result, the balance of the electronic money, which is stored in the non-contact IC chip 13, is subtracted by the amount of the price of the commodity.

For example, processing such as a message reporting that the subtraction of the balance is completed being transmitted from the non-contact IC chip 13 to the server application 11 is performed, and the series of processing is completed. Such series of processing makes it possible to realize the payment of the price of the commodity.

In addition to the payment of the price of the commodity as described above, the server/client system having such a configuration makes it possible to realize, for example, the management of points issued by shops, and the payment of fares when the client device 3 is provided as a ticket gate of a railway station. For the management of points and the payment of fares, basically, processing similar to the case of the above-described payment of the price is performed by each device of FIG. 1.

The server/client system having the configuration shown in FIG. 1 is disclosed in Japanese Unexamined Patent Application Publication No. 2003-141063.

SUMMARY OF THE INVENTION

In the server/client system, shown in FIG. 1, of the related art, a different server application needs to be provided for each type of the non-contact IC chip to be controlled in the server device 1.

For example, the place where the non-contact IC chip is placed and the type differ between the case where the client device 3 is a terminal disposed in a shop and the non-contact IC chip to be controlled is incorporated in a cellular phone held up to the R/W of the terminal of that shop and the case where the client device 3 is a personal computer and the non-contact IC chip to be controlled is embedded in the card placed in the R/W of the personal computer. Therefore, when the same services are to be provided, each of different server applications needs to be provided in the server device 1.

Therefore, when considered from the service providing side, a server application needs to be provided for each type of the non-contact IC chip to be controlled, and this becomes a big burden.

The present invention has been made in view of such circumstances. It is desirable to be capable of generating commands corresponding to a plurality of different types of IC chips in response to a request from one server.

According to an embodiment of the present invention, there is provided an information management apparatus for generating a command in response to a request from a server for transmitting a command to an integrated circuit chip to be controlled, the information management apparatus including: means for managing the type of integrated circuit chip which is related to the type of command to be executed by the integrated circuit chip; means for obtaining information on the type of the integrated circuit chip to be controlled; and means for generating a command of the type corresponding to the type of the integrated circuit chip to be controlled, the type of the integrated circuit chip being obtained by the obtaining means, from among a plurality of different types of commands corresponding to the command requested from the server and for transmitting the generated command to the server.

The obtaining means may be provided between the integrated circuit chip to be controlled and the server in a communication path, and may be configured to obtain information on the type of the integrated circuit chip to be controlled on the basis of information transmitted from a client for allowing the integrated circuit chip to be controlled to execute a predetermined command.

The information management apparatus may manage the type of integrated circuit chip which is related to a method of authenticating an integrated circuit chip and/or a method of encryption performed on data to be transmitted to the integrated circuit chip.

The data may be a command to be executed by the integrated circuit chip.

According to another embodiment of the present invention, there is provided an information management method for generating a command in response to a request from a server for transmitting a command to an integrated circuit chip to be controlled, the information management method including the steps of: managing the type of integrated circuit chip which is related to the type of command to be executed by the integrated circuit chip; obtaining information on the type of the integrated circuit chip to be controlled; and generating a command to the type corresponding to the type of the integrated circuit chip to be controlled, the type of the integrated circuit chip being obtained in the obtaining step, from among a plurality of different types of commands corresponding to the command requested from the server and for transmitting the generated command to the server.

According to another embodiment of the present invention, there is provided a program for enabling a computer to perform processing for managing the type of integrated circuit chip which is related to the type of command to be executed by the integrated circuit chip and for generating a command in response to a request from a server for transmitting a command to an integrated circuit chip to be controlled, the program including the steps of: obtaining information on the type of the integrated circuit chip to be controlled; and generating a command of the type corresponding to the type of the integrated circuit chip to be controlled, the type of the integrated circuit chip being obtained in the obtaining step, from among a plurality of different types of commands corresponding to the command requested from the server and for transmitting the generated command to the server.

In the information management apparatus, the information management method, and the program in accordance with the embodiments of the present invention, the type of an IC chip to be controlled is obtained, a command of the type corresponding to the type of the IC chip to be controlled from among a plurality of different types of commands corresponding to the command requested from the server is generated, and the generated is transmitted to the server.

According to the embodiments of the present invention, it is possible to generate commands corresponding to a plurality of different types of IC chips.

BRIEF DESCRIPTION OF THE DRAWINGS

FIG. 11 shows an example of a correspondence table managed by a secure chip manager module;

DESCRIPTION OF THE PREFERRED EMBODIMENTS

Figure 1:
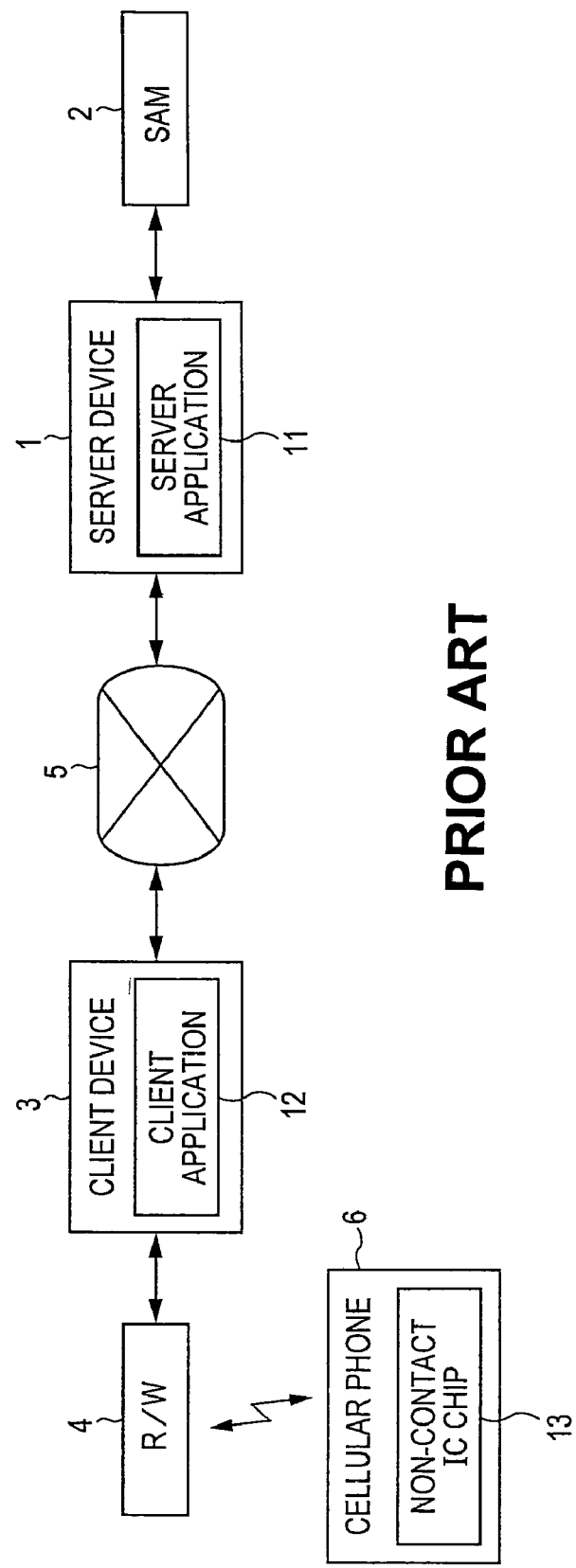
FIG. 1 is a block diagram showing an example of the configuration of an electronic money system of the related art.

Embodiments of the present invention will now be described below. The corresponding relationship between the aspects of the invention described in this specification and the embodiments of the invention is described below as an example. This description is to confirm that the embodiments supporting the invention are described in this specification. Therefore, even if there are embodiments that are not described here as those corresponding to the invention although described in the embodiments of the invention, that fact does not mean that the embodiments do not correspond to the invention. Conversely, even if the embodiments are described here as those corresponding to aspects of the invention, that fact does not mean that the embodiments do not correspond to the other aspects of the invention.

Furthermore, this description does not mean all the aspects of the invention described in this specification. In other words, this description is on the invention described in this specification, and does not deny the existence of another aspect of the invention that is not claimed in this application, that is, the existence of another aspect of the invention for which a divisional application will be filed or which will be added by amendments in the future.

The information management apparatus according to the embodiment of the present invention is an information management apparatus (for example, a computer 63 of FIG. 4) for managing the type of integrated circuit chip and the type of command to be executed by the integrated circuit chip in such a manner as to correspond to each other and for generating a command in response to a request from a server (for example, a server application 51 of FIG. 4) for transmitting a command to an integrated circuit chip (for example, a secure chip 41 of FIG. 4) to be controlled. The information management apparatus includes: obtaining means (for example, a secure chip manager module 132 for performing the process of step Sill of FIG. 13) for obtaining the type of the integrated circuit chip to be controlled; and command generation means (for example, a secure chip command module 131 for performing the process of step S76 of FIG. 13) for generating a command of the type corresponding to the type of the integrated circuit chip to be controlled, the type being obtained by the obtaining means, from among a plurality of different types of commands corresponding to the command requested from the server and for transmitting the generated command to the server.

The obtaining means of the information management apparatus according to the embodiment of the present invention is provided between the IC chip to be controlled and the server in a communication path, and obtains the type of the IC chip to be controlled on the basis of information (for example, initial information transmitted in step S23 of FIG. 13) transmitted from a client for allowing the IC chip to be controlled to execute a predetermined command.

Figure 4:
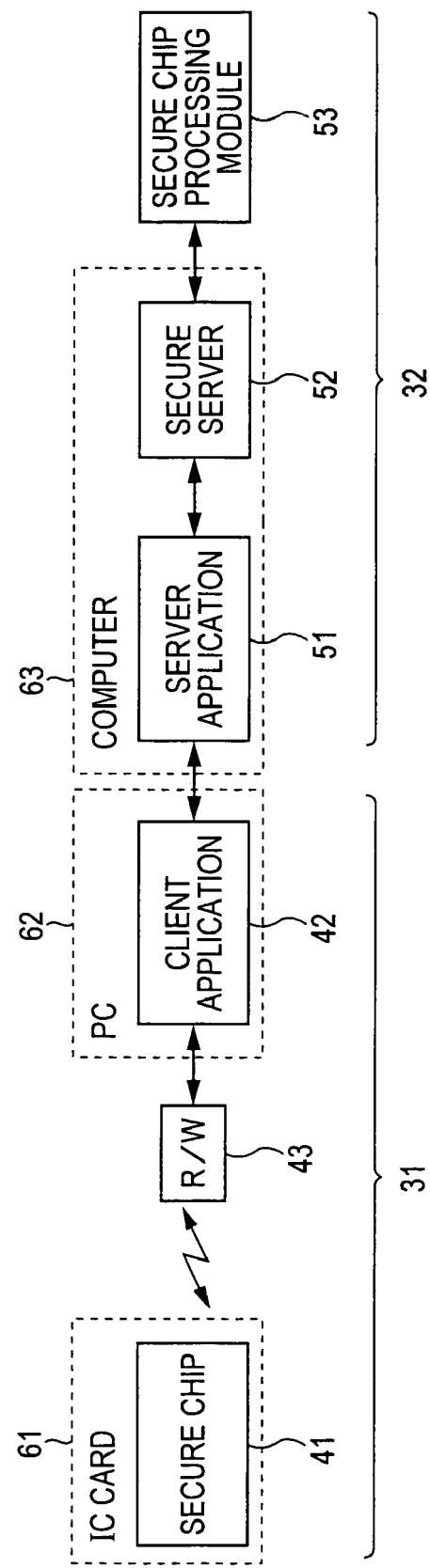
FIG. 4 is a block diagram showing a specific example of the hardware configuration of the client-side devices and the server-side devices.

The information management method according to the embodiment of the present invention is an information management method for managing the type of IC chip and the type of command to be executed by the IC chip in such a manner as to correspond to each other and for generating a command in response to a request from a server (for example, a server application 51 of FIG. 10) for transmitting a command to an IC chip to be controlled (for example, a secure chip 41 of FIG. 4). The information management method includes the steps of: obtaining (for example, step S111 of FIG. 13) the type of the IC chip to be controlled; and generating (for example, step S76 of FIG. 13) a command of the type corresponding to the type of the IC chip to be controlled, the type of the IC chip being obtained in the obtaining step, from among a plurality of different types of commands corresponding to the command requested from the server and for transmitting the generated command to the server.

In the program according to the embodiment of the present invention, also, an embodiment (one example) to which each step corresponds is the same as that of the information management method described in the embodiment of the present invention.

Preferred embodiments of the present invention will now be described below with reference to the drawings.

Figure 2:
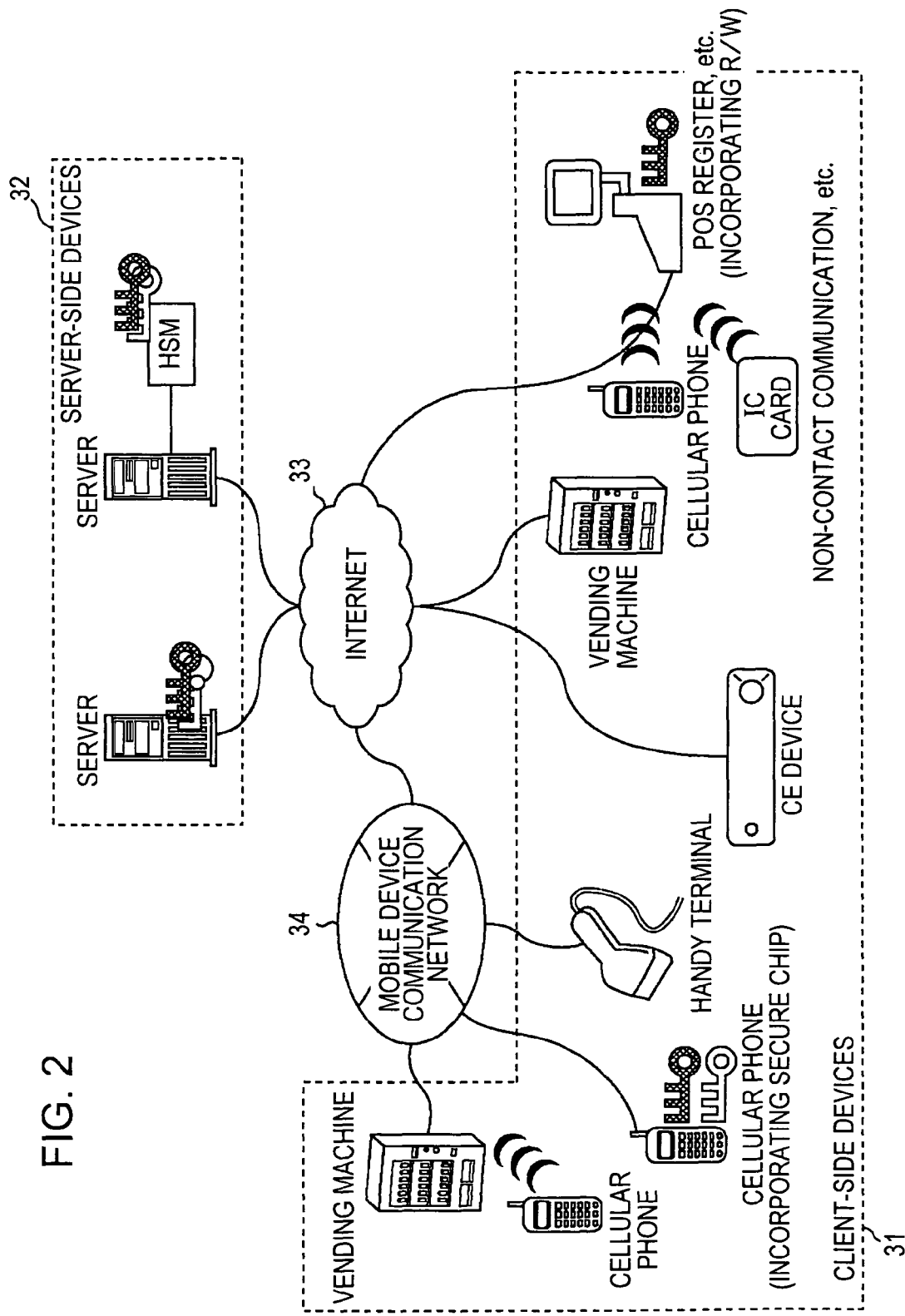
FIG. 2 is a block diagram showing an example of the configuration of a server/client system to which an embodiment of the present invention is applied.

FIG. 2 shows an example of the configuration of a server/client system (The system designates a logical assembly of a plurality of devices. It is not essential that the devices be disposed in the same housing.) to which an embodiment of the present invention is applied.

The server/client system of FIG. 2 is constructed in such a way that various client-side devices 31, which are so-called clients, and server-side devices 32, which is so-called servers, are connected to one another via, for example, a network 33 such as the Internet, and furthermore via, for example, a network 34 such as a mobile communication network as necessary.

The client-side device 31 incorporates a secure chip. The secure chip is a secure IC chip having tamper resistance, and is designed to be capable of exchanging data with other devices in a contact or non-contact manner.

Examples of the client-side devices 31 include a portable terminal such as a cellular phone and a PDA (Personal Digital Assistant), a PC, a POS (Point Of Sales) register (register for a POS system), a vending machine, and a handy terminal. Examples of the secure chip incorporated in the client-side device 31 include FeliCa (registered trademark) adopted in Suica (registered trademark) serving as an electronic commuter pass.

The server-side device 32 exchanges data with the client-side devices 31 via the network 33 and further via a network 34 as necessary, thereby providing various kinds of services. More specifically, for example, when electronic money is stored in the secure chip of the client-side device 31, the server-side device 32 controls the processing of subtracting the price of the commodity from the electronic money of the client-side devices 31 and of updating the electronic money of the client-side devices 31 so as to become the amount of money after the subtraction, and thus the server-side device 32 provides electronic money services.

The client-side device 31 encrypts and transmits the data to be transmitted to the server-side device 32, and the server-side device 32 also encrypts and transmits the data to be transmitted to the client-side device 31.

The encryption processing, such as encryption in the client-side device 31 and further the decryption of the encrypted data, is performed in the tamper-resistant secure chip. There are cases in which the encryption processing in the server-side device 32 is performed in the HSM (Hardware Security Module), which is dedicated hardware having tamper resistance, and is performed by software for realizing the server-side device 32 without using such tamper-resistant HSM.

There are two types of encryption processes: an encryption process demanding particularly high secrecy and encryption processes other than that. When the server-side device 32 includes an HSM, only the encryption process demanding particularly high secrecy can be performed in the HSM, and the other encryption process can be performed by software for implementing the server-side device 32.

Figure 3:
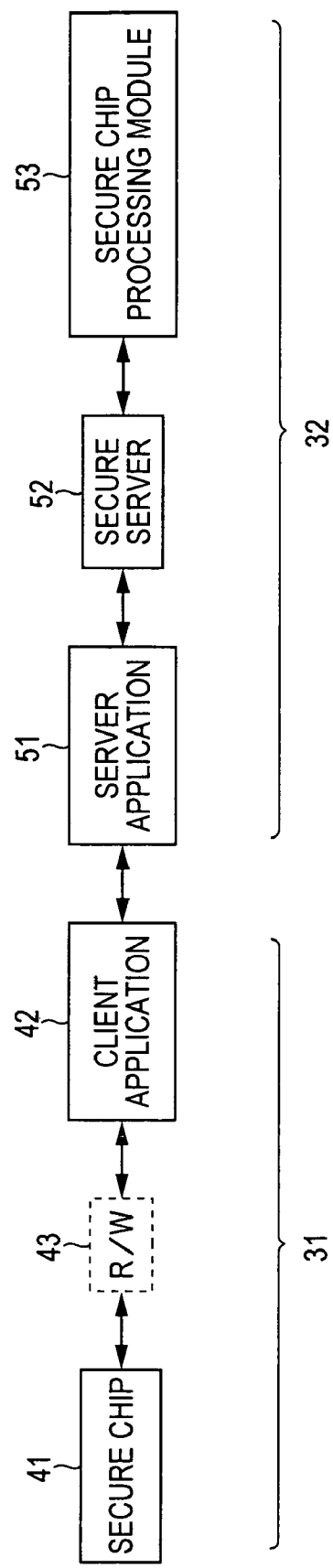
FIG. 3 is a block diagram showing an example of the configuration of client-side devices and server-side devices of FIG. 2.

FIG. 3 is a block diagram showing an example of the functional configuration of the client-side devices 31 and the server-side devices 32.

The client-side devices 31 include a secure chip 41, a client application 42, and an R/W 43 as necessary.

The secure chip 41 is a tamper-resistant, secure IC chip, and exchanges data with other devices in a contact or non-contact manner.

More specifically, the secure chip 41 communicates with the client application 42 directly or via the R/W 43, and performs processing, for example, in accordance a command transmitted from the client application 42 through the communication. After the processing, the secure chip 41 transmits response data as a response for the command directly or via the R/W 43 to the client application 42. The secure chip 41 also performs an encryption process on data to be transmitted and received in order to ensure security.

The client application 42 is, for example, software executed by a computer that is hardware, and functions as a client for the server application 51 (to be described later) of the server-side device 32. Since the client application 42 functions as a client for the server application 51 and transmits, for example, a command to the secure chip 41, the client application 42 exists between the secure chip 41 and the server application 51 in the communication path.

The client application 42 reads or writes data from or to the secure chip 41 by exchanging data (including a command) with the server application 51 and also by transmitting, for example, a command to the secure chip 41 directly or via the R/W 43, thereby realizing various kinds of services.

More specifically, for example, when the client application 42 and the server application 51 are software for providing electronic money services and a storage area for electronic money services is allocated in the secure chip 41, the exchange of data (including a command) necessary for processing for electronic money services, such as the price of the commodity being subtracted from the electronic money stored in the secure chip 41 and the amount of the electronic money stored in the secure chip 41 being updated to become the amount of money after the subtraction, is performed between the client application 42 and the server application 51.

The client application 42 includes a module for controlling communication with the server application 51 as necessary.

The R/W 43 performs non-contact or contact communication with the secure chip 41, transmits a command, etc., supplied from the client application 42 to the secure chip 41, receives data, etc., transmitted from the secure chip 12, and supplies it to the client application 42.

The server application 51 is, for example, software executed by the computer, which is hardware, and functions as a server for the client application 42 of the client-side device 31. The server application 51 implements the above-described electronic money services and other various kinds of services by exchanging data (including a command) with the client application 42.

In order to ensure security, the server application 51 requests the secure server 52 to perform an encryption process for data to be transmitted and received.

The server application 51 contains a module for controlling communication with the client application 42 as necessary.

The secure server 52 is, for example, software executed in the computer, which is hardware, and performs an encryption process by itself or requests the secure chip processing module 53 to perform an encryption process in response to a request from the server application 51.

More specifically, the secure server 52 requests an encryption process demanding particularly high secrecy among encryption processes requested from the server application 51 to the secure chip processing module 53, and performs encryption processes other than that by itself (in the secure server 52).

The secure chip processing module 53 performs an encryption process (encryption process demanding particularly high secrecy) in response to a request from the secure server 52.

It is assumed here that the secure chip processing module 53 is stored in dedicated hardware having tamper resistance. However, the secure chip processing module 53 may also be used as, for example, one module (software) of the secure server 52. Hardware for storing the secure chip processing module 53 corresponds to, for example, the SAM 2 of FIG. 1.

FIG. 4 is a block diagram showing a specific example of the hardware configuration of the client-side devices 31 and the server-side devices 32.

In FIG. 4, the client-side devices 31 include an R/W 43, an IC card 61, and a PC 62.

The IC card 61 incorporates a secure chip 41, which is hardware, and corresponds to, for example, a card such as Edy (registered trademark) for storing electronic money.

The PC 62 is, for example, a PC possessed by a user of the IC card 61, and a client application 42 is installed therein. By operating the PC 62, the user is able to inquire the balance of the electronic money stored in the IC card 61 (the secure chip 41) and to charge the electronic money.

In FIG. 4, the server-side devices 32 include a secure chip processing module 53 and a computer 63.

The computer 63 is, for example, a server (machine) serving as hardware, with a server application 51 and a secure server 52 being installed therein.

Figure 5:
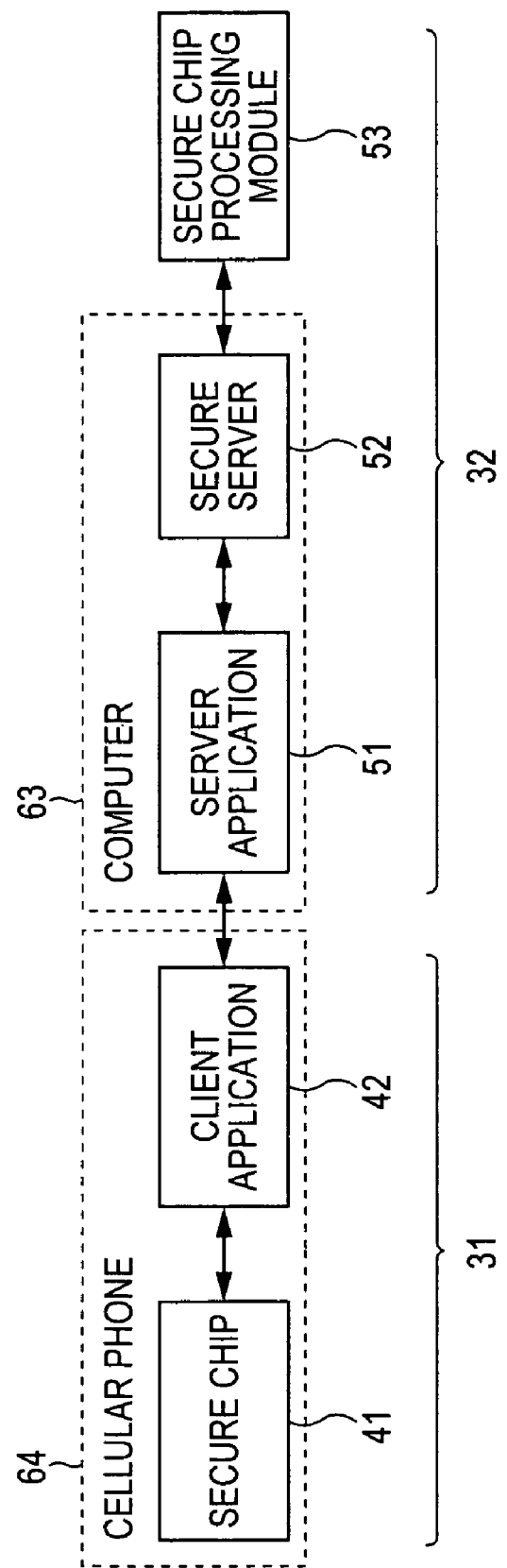
FIG. 5 is a block diagram showing another specific example of the hardware configuration of the client-side devices and the server-side devices.

FIG. 5 is a block diagram showing another specific example of the hardware configuration of the client-side devices 31 and the server-side devices 32. The hardware configuration of the server-side devices 32 in FIG. 5 is the same as that in FIG. 4.

In FIG. 5, the client-side devices 31 include a cellular phone 64.

The cellular phone 64 incorporates the secure chip 41, which is hardware. Furthermore, the client application 42 is installed in the cellular phone 64. By operating the cellular phone 64, the user is able to, for example, inquire the balance of the electronic money stored in the secure chip 41 and to charge the electronic money.

Access to the secure chip 41 incorporated in the cellular phone 64 can be performed using the communication function possessed by the cellular phone 64, and also, the access can also be performed by bringing the cellular phone 64 (the secure chip 41 incorporated in the cellular phone 64) closer to the R/W 43 (not shown in FIG. 5).

Figure 6:
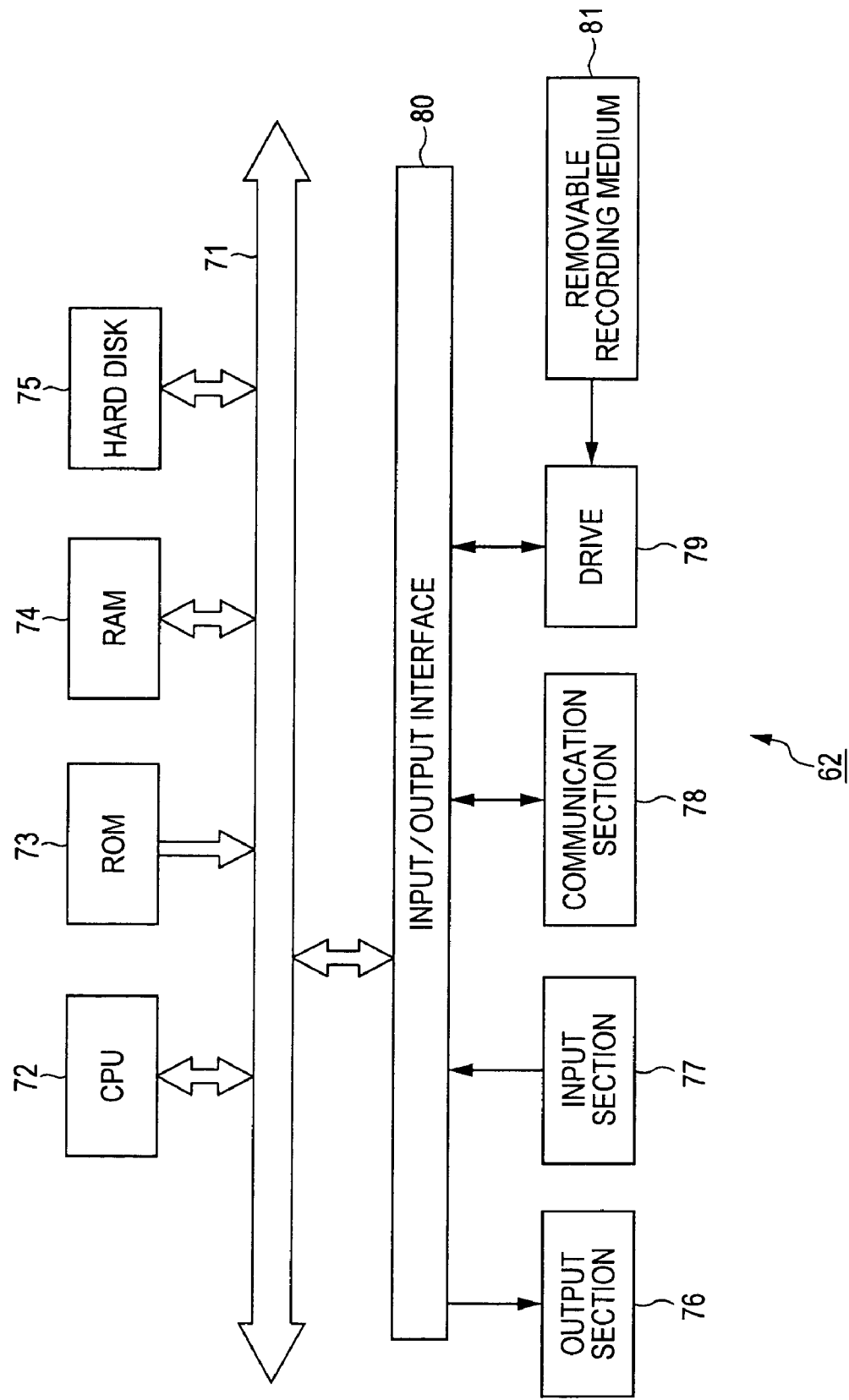
FIG. 6 is a block diagram showing an example of the hardware configuration of a PC of FIG. 4.

FIG. 6 is a block diagram showing an example of the hardware configuration of the PC 62 of FIG. 4, in which the client application 42 is installed.

The PC 62 incorporates a CPU (Central Processing Unit) 72. An input/output interface 80 is connected to the CPU 72 via a bus 71. When an instruction is input via an input/output interface 80 by the user by operating an input section 77 including a keyboard, a mouse, a microphone, etc., the CPU 72 executes the program stored in the ROM (Read Only Memory) 73 in accordance with the instruction.

Furthermore, the CPU 72 loads, into a RAM (Random Access Memory) 74, a program stored in a hard disk 75, or a program that is transferred from a satellite or a network and that is received by a communication section 78 and installed into the hard disk 75, or a program that is read from a removable recording medium 81 loaded into a drive 79 and that is installed into the hard disk 75, and the CPU 72 executes the program.

As a result, the CPU 72 performs various kinds of processing. Then, the CPU 72 outputs the processing result from, for example, an output section 76 including an LCD (Liquid Crystal Display), a speaker, etc., via the input/output interface 80, transmits the processing result from the communication section 78, or records the processing result in the hard disk 75 as necessary.

The input/output interface 80 is provided with, for example, a USB (Universal Serial Bus) terminal, and the R/W 43 of FIG. 4 can be connected to the USB terminal.

Figure 7:
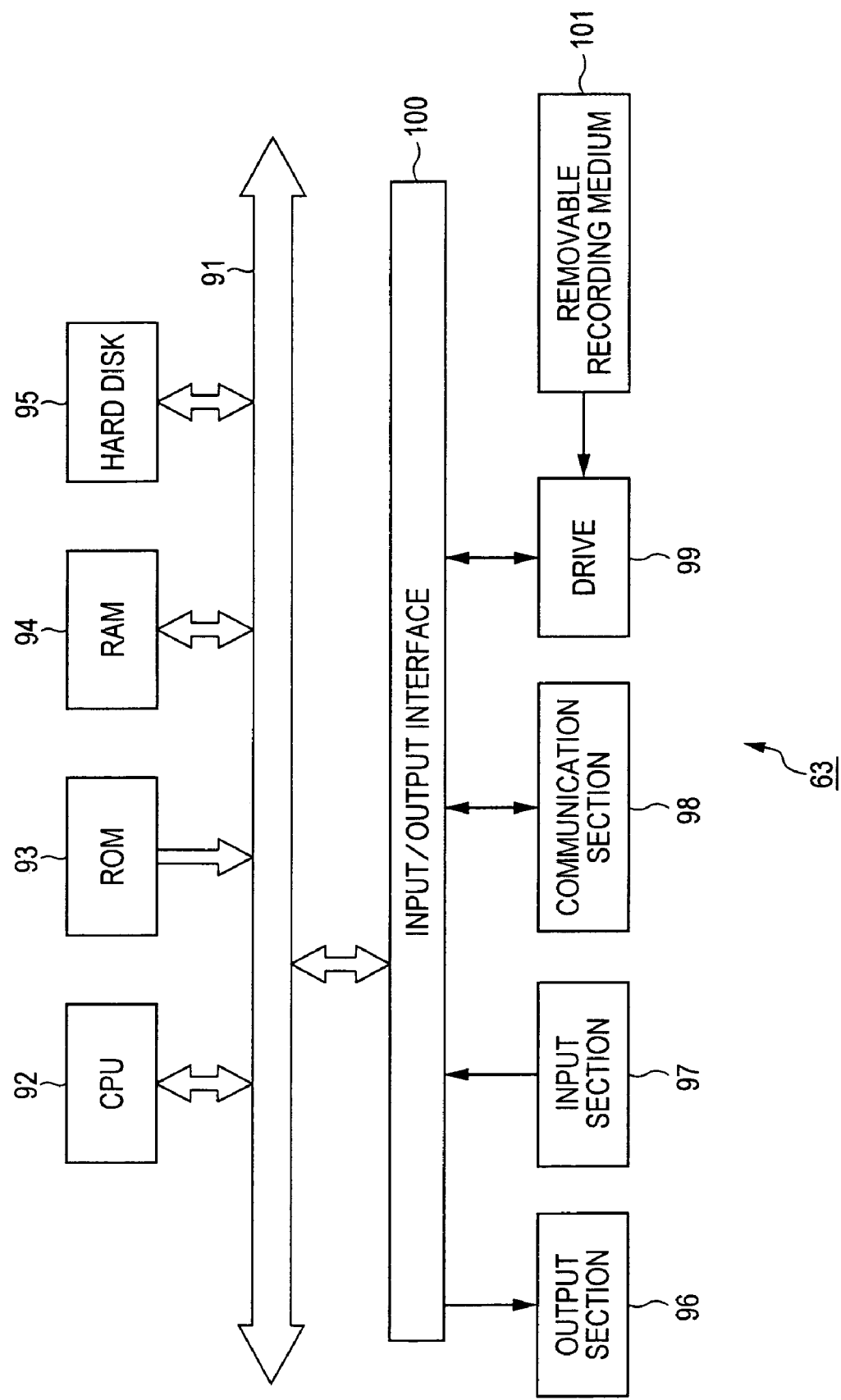
FIG. 7 is a block diagram showing an example of the hardware configuration of a computer of FIG. 4.

FIG. 7 is a block diagram showing an example of the hardware configuration of the computer 63 of FIG. 4, in which the server application 51 and the secure server 52 are installed.

In FIG. 7, the parts including a bus 91 through to a removable recording medium 101 forming the computer 63 are configured similarly to the parts including the bus 71 through to the removable recording medium 81 of FIG. 6. Accordingly the descriptions thereof are omitted.

Figure 8:
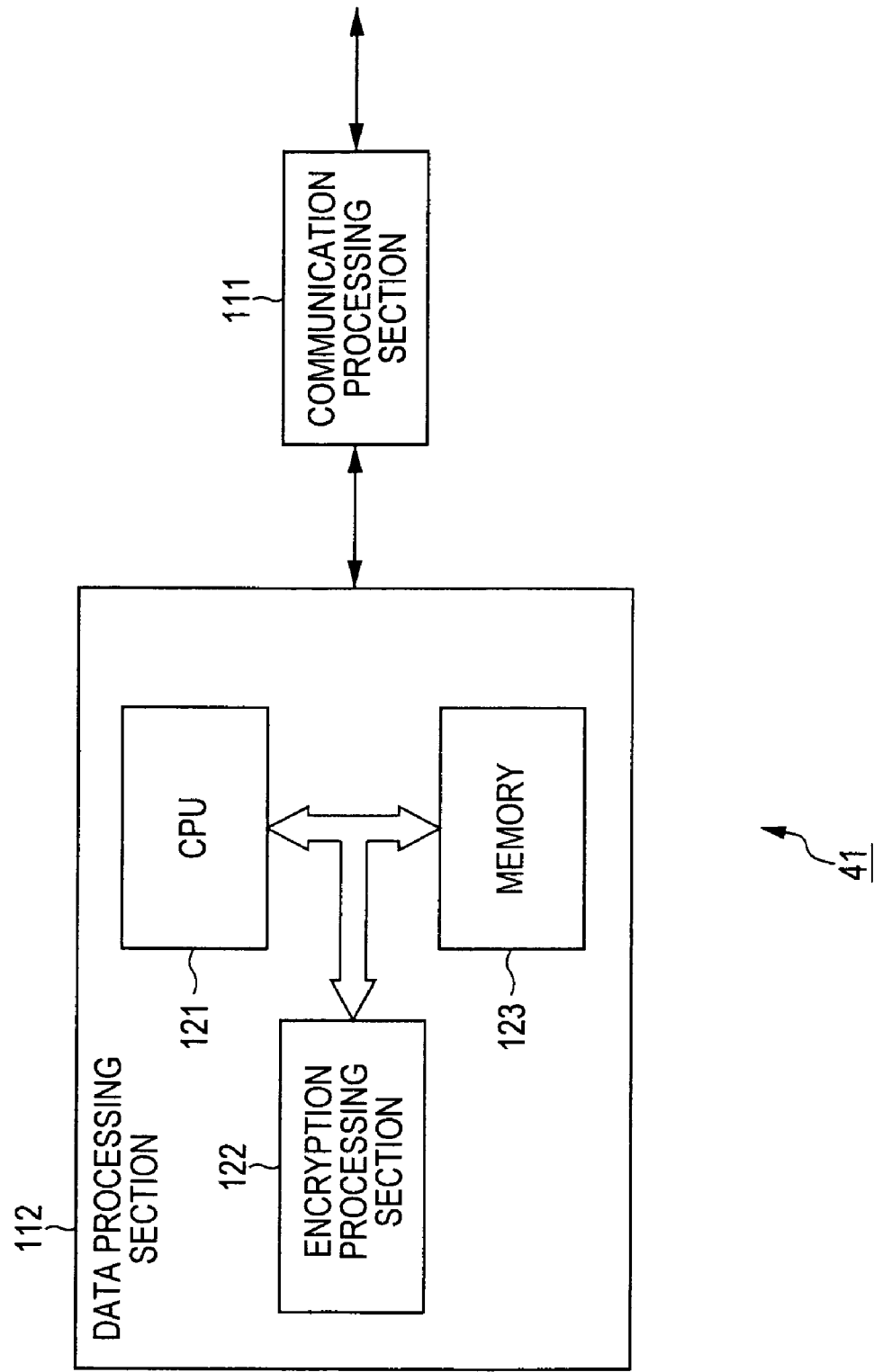
FIG. 8 is a block diagram showing an example of the hardware configuration of a secure chip of FIG. 3.

FIG. 8 is a block diagram showing an example of the hardware configuration of the secure chip 41 of FIG. 3.

The secure chip 41, when broadly classified, includes a communication processing section 111 and a data processing section 112. The communication processing section 111 performs processing necessary for communicating outside of the secure chip 41 in a contact or non-contact manner, thereby supplying data (including a command) that is externally transmitted to the data processing section 112, and externally transmits data from the data processing section 112. Processes necessary for communicating with the outside, which are performed in the secure chip 41, include coding/decoding of data and modulation/demodulation of data.

The data processing section 112 includes, for example, a CPU 121, an encryption processing section 122, and a memory 123, and performs various kinds of processes in accordance with a command supplied from the communication processing section 111.

More specifically, the CPU 121 performs control of the encryption processing section 122 and the management of the memory 123. Furthermore, in accordance with the command supplied from the communication processing section 111, the CPU 121 reads and writes data to and from the memory 123, and performs data processing on the data stored in the memory 123. The CPU 121 performs various kinds of processes by executing a program, which is stored in the memory 123.

Under the control of the CPU 121, in addition to the encryption process for encrypting/decryption data (including a command), the encryption processing section 122 also performs an authentication process, such as the generation of a random number used for authentication in the challenge-response system and the generation of a key (information serving as an encryption key) used for encryption/decryption. That is, the encryption processing section 122 performs various kinds of processes using encrypted data.

The memory 123 is a non-volatile memory and stores data, programs, etc. The memory 123 may be physically one memory, and may also be a plurality of memories. When the memory 123 is physically formed of a plurality of memories, a volatile memory can be used as a memory for some of the memories.

Figure 9:
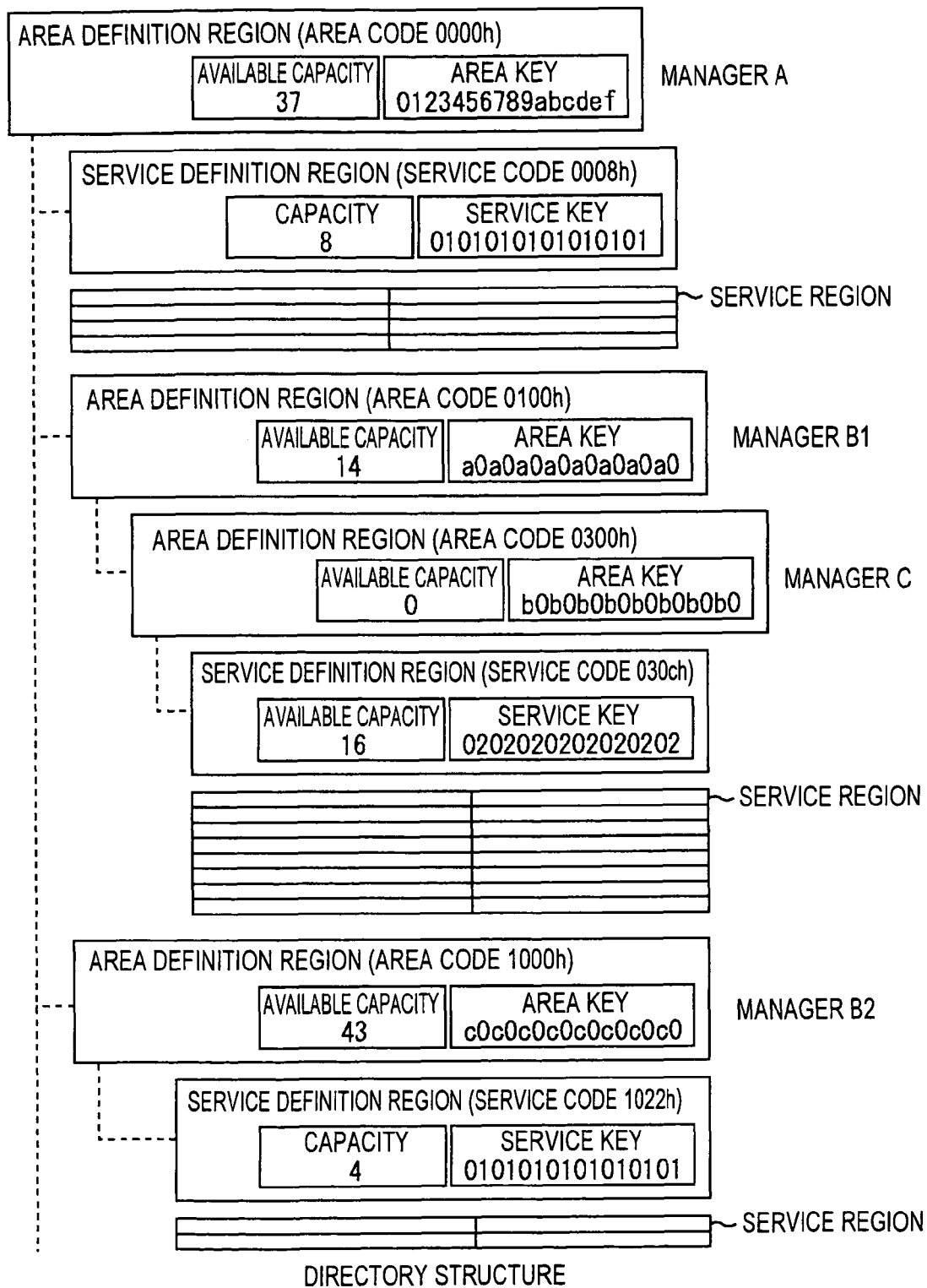
FIG. 9 shows an example of the directory structure of the secure chip.

In the CPU 121, as shown in FIG. 9, the storage area of the memory 123 is managed in such a manner as to be formed into a hierarchy.

FIG. 9 shows the directory structure of the memory 123.

A portion of the storage area of the memory 123 is used as a data storage area for storing data used to provide various kinds of services. This data storage area has a hierarchical structure in which area definition regions corresponding to the so-called directory are a hierarchy. The area definition region is formed to have an area definition region and a service definition region.

The area definition region is a portion of the data storage area of the memory 123 and is assigned to the manager (may be a service provider itself) for managing service providers for providing services. In the area definition region, an area code as an identification code that can be used as a name for identifying the area definition region, an available capacity indicating the number of usable available blocks, an area key serving as a key necessary to access the area definition region (including an area definition region and a service definition region in a hierarchy at a lower level than the area definition region), etc., are arranged.

In the embodiment of FIG. 9, the area definition region assigned to the manager A forms the highest hierarchy, and by using this as the parent hierarchy, the area definition regions of managers B1 and B2 are created. Furthermore, by using the area definition region of the manager B1 as the parent hierarchy, the area definition region of a manager C is created.

The service definition region is a portion of the data storage area of the memory 123 for managing the service region (to be described later), and is assigned to the services provided by the service provider. In the service definition region, a service code as an identification code that can be used as a name for identifying the service definition region, the number of blocks indicating the size of the service region for storing data necessary to provide services, a service key as a key necessary to access the service definition region (including the service region managed by the service definition region), etc., are arranged.

The service region is a portion of the data storage area, and is formed of 0 or more blocks in which data necessary to provide services is stored. The number of blocks forming the service region is arranged as the capacity of the service definition region for managing the service region.

Here, the CPU 121 manages the data storage area of the memory 123 in units of the blocks of a fixed storage capacity, and the available capacity and the size of the service region in FIG. 9 are managed by this number of blocks.

The service provider creates a service definition region in a hierarchy at a lower level than the area definition region managed by the manager, and provides various kinds of services by using the service region managed in that service definition region. For example, when providing electronic money services, the amount of money (balance) of the electronic money, the information of the commodity (for example, the commodity name, the price, etc.) purchased by electronic money, etc., are stored in the service region.

Figure 10:
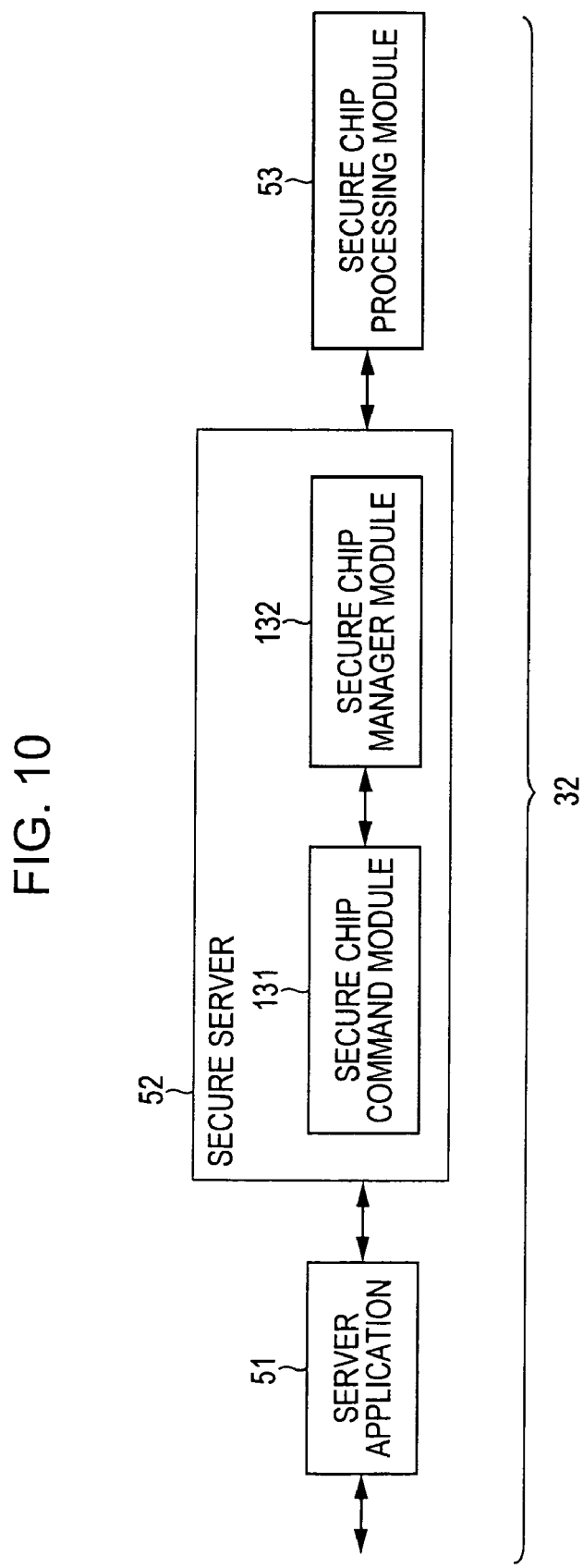
FIG. 10 is a block diagram showing an example of the detailed configuration of a secure server of FIG. 3.

FIG. 10 is a block diagram showing an example of the detailed configuration of the secure server 52 of FIG. 3.

The secure server 52 includes a secure chip command module 131 and a secure chip manager module 132.

In response to, for example, a request for generating a command from the server application 51, the secure chip command module 131 generates a command for the secure chip 41 to be controlled and supplies it to the server application 51. That is, when the server application 51 instructs some processing on the secure chip of the client-side device 31, the server application 51 requests the secure chip command module 131 to generate a command corresponding to the processing.

As will be described later, the secure chip command module 131 obtains the chip type of the secure chip 41 to be currently controlled, generates a command corresponding to the chip type of the secure chip 41 in response to a request from the server application 51, and uses the command as a command for the secure chip 41. The command for the secure chip 41, which is generated by the secure chip command module 131, is supplied to the server application 51.

Therefore, since it is not necessary for the server application 51 to know (may know) the command for the secure chip 41 to be controlled, even if secure chips of various command systems (secure chips having differences in the operation codes as commands, in the parameters, and in the types of commands) exist, the server application 51 needs not to be produced for each of the secure chips of such various command systems.

More specifically, the server application 51 needs only to be capable of using the command system that can be understood by the secure chip command module 131. This makes it possible for one server application 51 to deal with a plurality of different types of the secure chips 41.

Here, in response to a request from the server application 51, the secure chip command module 131 generates a command for the secure chip 41 and supplies it to the server application 51. Before the command is supplied to the server application 51, the secure chip command module 131 supplies it to the secure chip manager module 132 so as to request the encryption of the command. Then, in response to the request, the secure chip command module 131 supplies the encryption information (the encrypted command, etc.) supplied from the secure chip manager module 132 to the server application 51.

The secure chip manager module 132 manages the type of command to be executed by the secure chip 41 and the type of an encryption process including the method of encrypting the command to be executed by the secure chip 41 and an authentication method performed with the secure chip 41 in such a manner as to correspond to the type of the secure chip 41 to be controlled. Based on the type of the secure chip to be currently controlled, which is reported from the server application 51, the secure chip manager module 132 selects the type of the command and the type of the encryption process (hereinafter, these will be referred to as a "command type" and an "encryption processing type", respectively, as appropriate).

For example, the command type selected by the secure chip manager module 132 is reported to the secure chip command module 131. In the secure chip command module 131, the command of the command type reported from the secure chip manager module 132 is generated. As a result, in the manner described above, the command for the secure chip to be currently controlled is generated.

FIG. 11 shows an example of a correspondence table managed by the secure chip manager module 132.

In the correspondence table of FIG. 11, the command type and the encryption processing type correspond to the type of the secure chip (chip type) of each of "FeliCa1", "FeliCa2", "GP1", and "GP2".

For example, the command type "Type 11" and the encryption processing type "Type 12" correspond to "FeliCa1", and the command type "Type 12" and the encryption processing type "Type 12" correspond to "FeliCa2". Similarly, the command type "Type 21" and the encryption processing type "Type 21" correspond to "GP1", and the command type "Type 22" and the encryption processing type "Type 21" correspond to "GP2".

For example, when the fact that the type of the secure chip 41 to be currently controlled is "FeliCa1" is reported from the server application 51, the secure chip manager module 132 selects the command type "Type 11" from the correspondence table of FIG. 11, and reports the fact that the command type is "Type 11" to the secure chip command module 131. In the secure chip command module 131, the command of the type of "Type 11" is generated as a result of the combination of the command related to the type "FeliCa1" of the secure chip 41 to be currently controlled, and the command is set as a command for the secure chip 41.

More specifically, it is assumed that, for example, three types of commands, that is, the issue command, the read command, and the write command, are defined. When the issue command from among them is requested from the server application 51, in the secure chip command module 131, a "register command" and a "commit command" are generated as a result of the combination of the command related to the type of the secure chip 41 to be currently controlled, which is reported from the secure chip manager module 132. That is, in this case, both the commands "register command" and "commit command" related to the type "FeliCa1" of the secure chip 41 correspond to the issue command, and a command group corresponding to a uniquely specific secure chip is selected according to the type of the secure chip.

Furthermore, the secure chip manager module 132 performs a command encryption process by itself according to the encryption processing type "Type 12" (the encryption processing type of the secure chip 41 of the type of "FeliCa1" to be currently controlled) selected from the correspondence table of FIG. 11, and controls the encryption process by the secure chip processing module 53 so that an encryption process corresponding to the encryption processing type "Type 12" is performed.

There are the following encryption processes. For example, an encryption process to be used with the secure chip 41 to be controlled is determined as a result of the next encryption process being appropriately combined according to the type of the secure chip 41.

1. Authentication Method (1) Whether mutual authentication should be performed between the server-side device 32 and the secure chip 41, or whether authentication on one side should be performed (2) Whether or not a session key for encrypting a communication path (to be described later) should be shared at the same time as mutual authentication or authentication on one side is performed 2. Method of Encrypting Command (Method of Encrypting Communication Path)

(1) Whether the whole of the command should be encrypted or a part of the command should be encrypted (2) Whether or not an encryption key for performing encryption, which differs for each session (session key), should be used 3. Method of an Encryption Process for the Data of the Right Document Indicating the Execution Right for Executing a Special Command (to be Described Later)

(1) Whether encryption using a predetermined key should be performed on the right document indicating the execution right (2) Whether a signature should be affixed to the right document indicating the execution right (3) Whether a hashed value should be obtained by applying a predetermined hash function on the right document indicating the execution right More specifically, the following are selected according to the type of the secure chip 41 to be currently controlled that, as a method of authentication between the server-side device 32 and the secure chip 41, mutual authentication is performed (selection of 1.); a session key for encrypting a communication path is shared at the same time as the mutual authentication; the complete commands are encrypted as a method of generating a command (selection of 2.); an encryption key for performing encryption, which differs for each session, is used; and as a method of encrypting the right document indicating the execution right (selection of 3.), encryption is not performed on the right document indicating the execution right, a hash function is not applied, but a signature is affixed.

Furthermore, an encryption/signature algorithm (DES, T-DES, RSA, EC-DSA, etc.), which is specifically used in the authentication, the communication path encryption, the execution right encryption process, a method of challenge/response in the authentication, the format at which a specific encryption/signature should be performed, a padding rule, etc., are specified by the secure chip type.

As a result, without being concerned with the type of the secure chip 41 to be controlled, the server application 51 is able to obtain a command on which an encryption process corresponding to the type of the secure chip is performed, such as a command for the secure chip 41 corresponding to the chip type and the whole of the command being subjected to encryption, by only requesting the issue command, the read command, and the write command described above. When this is viewed from the server application 51, it may be said that so-called virtualization of the commands and the encryption processing is performed.

Figure 12:
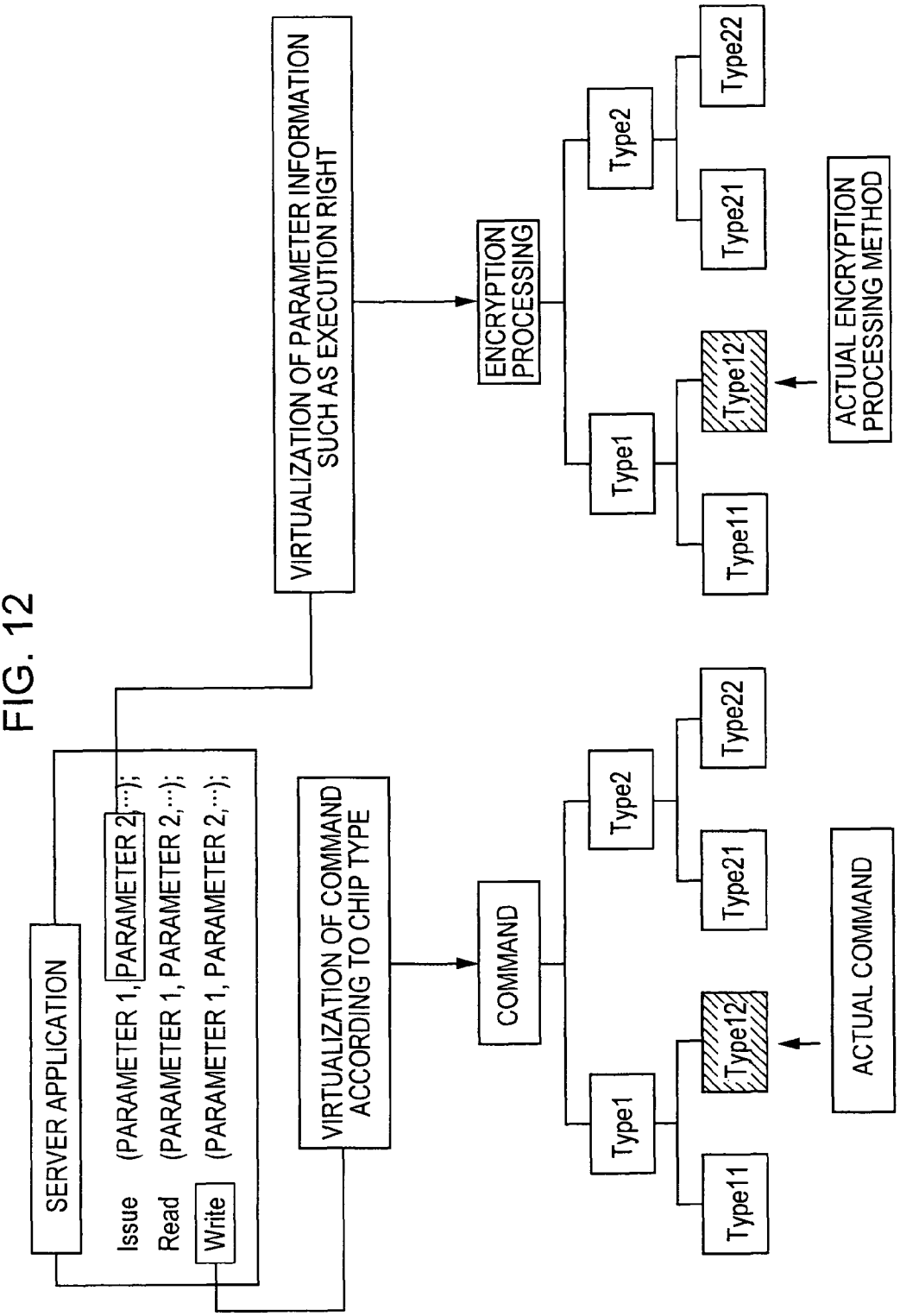
FIG. 12 shows a specific example of virtualization of commands and encryption processing.

FIG. 12 shows a specific example of virtualization of commands and encryption processing.

For example, as shown in FIG. 12, when the generation of the issue command containing parameter data of parameters 1 and 2 is requested from the server application 51, the encryption process identified by "Type 12" (the encryption process indicated by the "actual encryption processing method" in FIG. 12 is performed on the parameter 2. In FIG. 12, the type of the encryption process is first classified into "Type 1" and "Type 2", and "Type 1" is further classified into "Type 11" and the "Type 12". "Type 2" is further classified into "Type 21" and "Type 22".

As a result of the server application 51 requesting the generation of the issue command including parameters 1 and 2, as an encryption process of the type corresponding to the type of the secure chip 41, encryption is performed on parameter 2 regardless of the type of the secure chip 41 to be controlled. As a result, the virtualization of the encryption process is realized.

Similarly, for example, as shown in FIG. 12, when the generation of the write command including the parameter data of parameters 1 and 2 is requested from the server application 51, the command (the actual command in the figure) identified by "Type 12" is selected as the command part excluding the parameter data part. In FIG. 12, the type of the command is first classified into "Type 1" and "Type 2", and "Type 1" is further classified into "Type 11" and "Type 12". "Type 2" is further classified into "Type 21," and "Type 22".

As a result of the server application 51 requesting the write command including parameters 1 and 2, as the command of the type corresponding to the type of the secure chip 41, the command of "Type 12" is selected regardless of the type of the secure chip 41 to be controlled. As a result, the virtualization of the commands is realized.

Referring back to FIG. 10, the secure chip manager module 132 supplies the encryption information obtained by the encryption process by itself (the secure chip manager module 132) or by the secure chip processing module 53 to the secure chip command module 131.

Figure 13B:
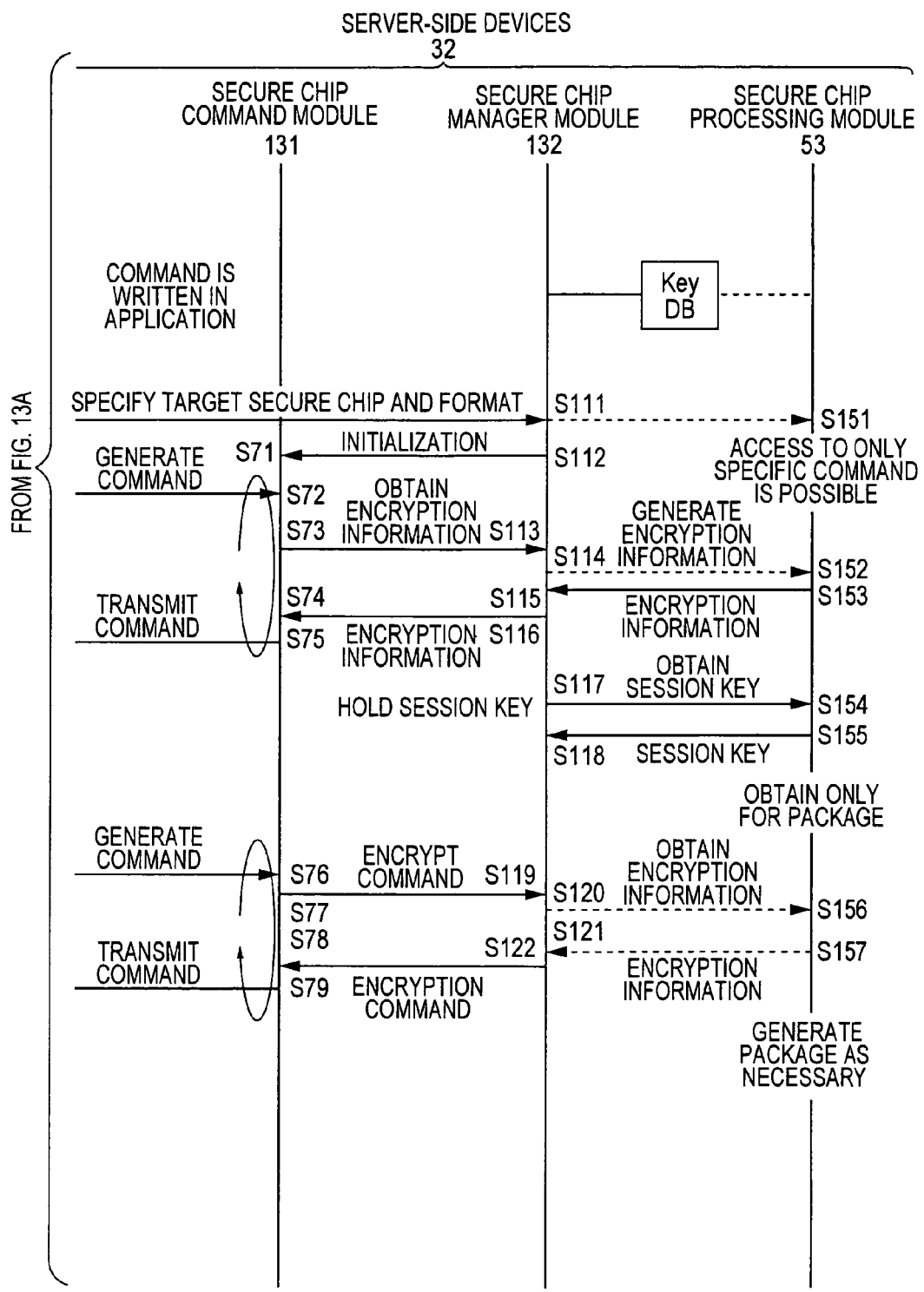
FIG. 13, consisting of FIG. 13A and FIG. 13B, is a flowchart illustrating the operation of the client-side devices and the server-side devices.

Next, a description is given, with reference to the flowchart in FIG. 13, of the operation of the client-side devices 31 and the server-side devices 32.

When the client application 42 is started up, initially, in step S21, the client application 42 transmits a command requesting secure chip information about the secure chip to the secure chip 41.

In step S11, the secure chip 41 receives the command from the client application 42. The process then proceeds to step S12, where the secure chip information is transmitted as a response for the command to the client application 42.

In step S22, the client application 42 receives the secure chip information from the secure chip 41. The process then proceeds to step S23, where a server connection request for requesting a connection, together with the initial information containing the secure chip information, is transmitted to the server-side devices 32.

The initial information contains, in addition to the secure chip information, client information about the client application 42, and the information about the specification of the server application, which specifies the server application 51 of the server-side device 32, to which the client application 42 is going to connect to.

Examples of the secure chip information include the secure chip type, which is information indicating what kind the secure chip 41 is, the secure chip OS type, which is information indicating the OS (Operating System) adopted in the secure chip 41, and the secure chip file structure (the file format, the list of area codes, the list of service codes, etc.), which is information about the management of data in the secure chip 41. As a result, in the server-side devices 32, the type of the secure chip 41 to be currently controlled is specified.

Examples of the client information include the client type, which is the information about the hardware of the client-side devices 31 (for example, information such that the client-side device 31 is a cellular phone, a PC, or a POS register), the client OS type, which is information indicating the OS adopted in the client-side device 31, the client application ID (identification), which is information for specifying the client application 42, and the application version, which is information indicating the version of the client application 42.

Here, in response to a request for the secure chip information and other initial information from the server application 51, which is made after the connection to the server application 51 is performed, the client application 42 can also obtain the secure chip information from the secure chip 41 and can transmit the obtained secure chip information, which is contained in the initial information, to the server application 51.

However, as shown in FIG. 13, the case where the client application 42 obtains the secure chip information from the secure chip 41 and then transmits the initial information containing the secure chip information together with a server connection request to the server application 51 needs a lesser amount of exchange between the client application 42 and the server application 51.

Furthermore, in this case, the server-side device 32 can receive the client information at the same time as the starting of the access from the client-side device 31. Thus, based on the client information, the server-side device 32 can transmit and receive a command and a message (GUI (Graphical User Interface) for the screen, etc.) appropriate for the client application 42. Here, the command and the message appropriate for the client application 42 means, for example, a command and a message in which content is appropriate for the client application 42 or a command and a message in which the length and the number thereof that are transmitted and received at one time are appropriate for the client application 42.

In step S41, the server application 51 receives the server connection request and the initial information from the client application 42, and starts up an application (software) for providing necessary services to the client-side device 31. The process then proceeds to step S42.

In step S42, the server application 51 supplies the secure chip information and the client information, which are contained in the initial information received in step S41, to the secure chip manager module 132 of the secure server 52.

In step S111, the secure chip manager module 132 receives the secure chip information and the client information from the server application 51, and supplies the secure chip information to the secure chip processing module 53.

In step S151, the secure chip processing module 53 sets the range of the processing for the access from the secure chip 41 on the basis of the secure chip information from the secure chip manager module 132.

More specifically, the secure chip processing module 53 is designed to be capable of performing various secure chip and service encryption processes, and incorporates a key necessary for the various secure chip and service encryption processes (a key corresponding to a key set in each region formed in the memory 123 of the secure chip 41 is also incorporated).

If the secure chip 41 can receive, for example, only the electronic money services, the secure chip processing module 53 performs (permits) only a process necessary for providing the electronic money services with respect to the access from the secure chip 41. When the key used to encrypt/decrypt data in the electronic money services is determined in advance, the secure chip processing module 53 permits only the use of the key used to encrypt/decrypt data in the electronic money services, and does not permit the use of the key used to encrypt/decrypt data in the other services with respect to the access from the secure chip 41.

On the other hand, based on the secure chip information and the client information received from the server application 51 in step S111, the secure chip manager module 132 is placed in a state in which processing corresponding to the secure chip 41 and the client application 42 to be currently controlled is performed.

More specifically, based on the secure chip information supplied from the server application 51, the secure chip manager module 132 determines the type of the secure chip 41 to be currently controlled, and selects the command type and the encryption processing type corresponding to the determined type from the correspondence table shown in FIG. 11. As a result, the command generated and transmitted in the subsequent processing is set as a command of the type selected here, and the authentication process and the command encryption process necessary in the subsequent processing are set as processes corresponding to the encryption processing type selected here.

Then, in step S112, the secure chip manager module 132 supplies an initialization instruction to the secure chip command module 131.

In step S71, the secure chip command module 131 receives the instruction and initializes the status of itself so that it can perform a process corresponding to the secure chip 41. For example, the initialization instruction supplied from the secure chip manager module 132 also contains information indicating the command type selected by the secure chip manager module 132. Therefore, from here, when a command generation request is supplied from the server application 51, the secure chip command module 131 becomes possible to generate a command of the type corresponding to the type of the secure chip 41 to be currently controlled.

Thereafter, for example, mutual authentication is performed between the server application 51 and the secure chip processing module 53. When the authentication succeeds, next, authentication is performed between the secure chip 41 and the secure chip processing module 53. The authentication performed here is set as an authentication for the encryption processing type selected by the secure chip manager module 132.

The authentication between the secure chip 41 and the secure chip processing module 53 is performed by, for example, a challenge-response system. In the challenge-response system, the secure chip processing module 53 (the same applies to the secure chip 41) generates a random number, encrypts the random number, and performs an authentication by exchanging the random number with the secure chip 41. When this authentication succeeds, for example, duration the authentication, the random number generated by the secure chip processing module 53 is set as a session key for identifying the session between the secure chip 41 and the secure chip processing module 53.

Thereafter, for example, when it is determined that the session key for encrypting the communication path is shared in accordance with the selected encryption processing type, in the server-side devices 32, the command (including a parameter and other data attached to the command) to be transmitted to the secure chip 41 is encrypted using the session key generated by the authentication process herein as a key, and this command is transmitted to the client-side device 31. Furthermore, in the client-side device 31, data to be transmitted from the secure chip 41 to the server-side device 32 is encrypted by using the session key as a key in the secure chip 41, and this data is transmitted to the server-side device 32.

As described above, in each of the client-side device 31 and the server-side device 32, data is encrypted by using the session key as a key. As a result, the communication path between the client-side devices 31 and the server-side devices 32 is encrypted, that is, is realized as a so-called VPN (Virtual Private Network).

In step S43, the server application 51 supplies, to the secure chip command module 131, a command generation request to be transmitted to the secure chip 41. In step S72, the secure chip command module 131 receives the command generation request from the server application 51.

Then, in step S73, in response to the command generation request from the server application 51, the secure-chip command module 131 generates a command for the secure chip 41 (a command corresponding to the type of the secure chip 41), and supplies, to the secure chip manager module 132, a request for generating the command, and encrypting the command and setting it as encryption information.

In step S113, the secure chip manager module 132 receives, from the secure chip command module 131, the request for encrypting the command and setting it as encryption information. The process then proceeds to step S114, where the request is supplied to the secure chip processing module 53.

More specifically, in this case, since the session key used to encrypt the communication path exists in the secure chip processing module 53, the secure chip manager module 132 requests the secure chip processing module 53 to encrypt the command using the session key.

In step S152, the secure chip processing module 53 receives the request from the secure chip manager module 132 and encrypts the command in response to the request. Since the request from the secure chip manager module 132 contains, for example, information indicating the encryption processing type, in the secure chip processing module 53, an encryption process corresponding to the type is performed as appropriate.

In step S153, the secure chip processing module 53 supplies the encryption information obtained by the encryption of the command to the secure chip manager module 132.

In step S115, the secure chip manager module 132 receives the encryption information from the secure chip processing module 53. The process then proceeds to step S116, where the encryption information received from the secure chip processing module 53 is supplied to the secure chip command module 131.

In step S74, the secure chip command module 131 receives the encryption information from the secure chip manager module 132. The process then proceeds to step S75, where the encryption information (the encrypted command) is supplied to the server application 51.

In step S44, the server application 51 receives the encryption information from the secure chip command module 131. The process then proceeds to step S45, where the encryption information (the encrypted command) together with the data for the device, which is a message for the hardware as the client-side device 31, to the client application 42.

In step S24, the client application 42 receives the encryption information and the data for the device from the server application 51. The process then proceeds to step S25, where the encryption information is transmitted to the secure chip 41.

In step S13, the secure chip 41 receives the encryption information from the client application 42 and decrypts the encryption information into a command by using the session key. Furthermore, the secure chip 41 performs processing corresponding to the command, and in step S14, transmits response data as a response corresponding to the command to the client application 42. The response data is encrypted using the session key as necessary in the secure chip 41.

In step S26, the client application 42 receives the response data from the secure chip 41. The process then proceeds to step S27, where the response data is transmitted to the server application 51.

In step S46, the server application 51 receives the response data from the client application 42, performs processing corresponding to the response data, or supplies the response data to the secure chip command module 131 and the secure chip manager module 132.

On the other hand, in step S117, the secure chip manager module 132 supplies a request for the session key to the secure chip processing module 53.

In step S154, the secure chip processing module 53 receives the request for the session key from the secure chip manager module 132. The process then proceeds to step S155, where the session key obtained as a result of the authentication with the secure chip 41 is supplied to the secure chip manager module 132.

In step S118, the secure chip manager module 132 receives and holds the session key from the secure chip processing module 53.

Thereafter, for example, the encryption using the session key is performed by the secure chip manager module 132, and only the encryption demanding a higher level of secrecy is performed in the secure chip processing module 53. The encryption performed by the secure chip manager module 132 or the encryption performed by the secure chip processing module 53 corresponds to the type selected by the secure chip processing module 53 (for example, the whole of the command is encrypted or a part of the command is encrypted).

In this manner, as a result of performing encryption using the session key by the secure chip manager module 132 and performing only the encryption demanding a higher level of secrecy (including mutual authentication performed using encryption and the creation of a package (to be described later)) by the secure chip processing module 53, when compared to the case where all the encryption processes are performed in the secure chip processing module 53, the load of the secure chip processing module 53 can be reduced. As a result, the processing time in the secure chip processing module 53 can be shortened.

A plurality of tamper-resistant secure chip processing modules 53 can be provided, so that, by making the plurality of the secure chip processing modules 53 perform processing in a distributed manner, the load of one secure chip processing module 53 can be reduced.

Thereafter, in step S47, the server application 51 supplies, to the secure chip command module 131, a command generation request to be transmitted to the secure chip 41.

In step S76, the secure chip command module 131 receives the command generation request from the server application 51.

In step S77, in response to the command generation request from the server application 51, the secure chip command module 131 supplies, to the secure chip manager module 132, a request such that a command for the secure chip 41 (a command corresponding to the command type) is generated and the command is encrypted to be used as the encryption information.

In step S119, the secure chip manager module 132 receives the request such that the command is encrypted to be used as the encryption information from the secure chip command module 131.

When the request from the secure chip command module 131 is a request for encrypting a command other than a special command, the secure chip manager module 132 encrypts the command using the held session key. In step S122, the secure chip command module 131 supplies the encryption information obtained thereby to the secure chip command module 131.

On the other hand, when the request from the secure chip command module 131 is a request for encrypting a special command, in step S120, the secure chip manager module 132 supplies an encryption request for creating the execution right for executing the special command to the secure chip processing module 53.

Here, examples of the special commands include commands for requesting the registration and the deletion of an area definition region for the secure chip 41.

In step S156, the secure chip processing module 53 receives the request from the secure chip manager module 132, and performs an encryption process on the data of the right document indicating the execution right for executing the special command. The encryption process performed herein is also an encryption process of the type selected by the secure chip manager module 132.

Furthermore, the secure chip processing module 53 adds the data of the certificate certifying that the right document is valid to the encryption result of the right document. In step S157, the secure chip processing module 53 supplies the certificate and the encryption result of the right document as a package to the secure chip manager module 132.

In step S121, the secure chip manager module 132 receives the package from the secure chip processing module 53. The process then proceeds to step S122, where the special command is encrypted using the session key, and the encryption information such that the encryption result and the package are a set is supplied to the secure chip command module 131.

In step S78, the secure chip command module 131 receives the encryption information from the secure chip manager module 132. The process then proceeds to step S79, where the encryption information is supplied to the server application 51.

In step S48, the server application 51 receives the encryption information from the secure chip command module 131. The process then proceeds to step S49, where the encryption information, together with the data for the device, which is a message for the hardware as the client-side device 31, is transmitted to the client application 42.

In step S28, the client application 42 receives the encryption information and the data for the device from the server application 51. The process then proceeds to step S29, where the encryption information is transmitted to the secure chip 41.

In step S15, the secure chip 41 receives the encryption information from the client application 42, and decrypts the encryption information into a command. Furthermore, after the secure chip 41 confirms the command execution right as necessary, the secure chip 41 performs processing corresponding to the command. In step S16, the response data as a response corresponding to the command is transmitted to the client application 42.

In step S30, the client application 42 receives the response data from the secure chip 41. The process then proceeds to step S31, where the response data is transmitted to the server application 51.

In step S50, the server application 51 receives the response data from the client application 42, and performs processing corresponding to the response data.

Thereafter, when the communication with the client-side device 31 is to be terminated, the server application 51 transmits a termination report as a message of that fact to the client application 42 in step S51.

In step S31, the client application 42 receives the termination report from the server application 51. This completes the series of processing.

Although the series of the above-described processes can be performed by hardware, it can also be performed by software.

When the series of processes is to be performed by software, a program forming the software is installed from a network or a recording medium into a computer incorporated into dedicated hardware or is installed into, for example, a general-purpose personal computer capable of executing various functions by installing various programs.

The recording medium, as shown in FIG. 6, is formed of a removable recording medium 81 composed of a magnetic disk (including a flexible disk), an optical disk (including a CD-ROM (Compact Disk-Read Only Memory) or a DVD (Digital Versatile Disk)), a magneto-optical disk (including an MD (registered trademark) (Mini-Disk)), or a semiconductor memory, the recording medium being distributed to provide a program to the user separately from the main unit of the device. In addition, the recording medium is formed of a ROM 73 or a hard disk 75 in which a program is recorded, which is provided to the user by being incorporated in advance into the main unit of the device.

In this specification, the steps include not only processes which are carried out chronologically in the written order, but also processes which are executed concurrently or individually although these are not necessarily processed chronologically.

In this specification, the system represents the overall apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information management apparatus for generating a command in response to a request from a server, the command corresponding to a type of integrated circuit chip, the information management apparatus comprising:
    means for managing a type of integrated circuit chip contained in a cellular phone, the type of integrated circuit chip corresponding to the generated command;
    means for obtaining information indicating the type of the integrated circuit chip, contained in the cellular phone, corresponding to the request from the server;
    means for generating a command corresponding to the type of the integrated circuit chip and for transmitting the generated command to the server,
    wherein the generated command is encrypted by the means for generating a command prior to transmitting the generated command to the server, using encryption corresponding to the integrated circuit chip,
    wherein the generated command is one command from a plurality of commands, wherein the command corresponds to the type of the integrated circuit chip, and wherein the plurality of commands correspond to different types of integrated circuit chips; and
    means for transmitting the generated command to the cellular phone via a mobile communication network.

2. The information management apparatus according to claim 1, wherein the obtaining means is provided between the integrated circuit chip to be controlled and the server in a communication path, and is configured to obtain information on the type of the integrated circuit chip to be controlled on the basis of information transmitted from a client for allowing the integrated circuit chip to be controlled to execute a predetermined command.

3. The information management apparatus according to claim 1, wherein the management means manages the type of integrated circuit chip which is related to a method of authenticating an integrated circuit chip and/or a method of encryption performed on data to be transmitted to the integrated circuit chip.

4. The information management apparatus according to claim 3, wherein said data is a command to be executed by the integrated circuit chip.

5. An information management method for generating a command in response to a request from a server, the command corresponding to an integrated circuit chip on a cellular phone, the information management method comprising:
    managing the type of integrated circuit chip which is related to the type of command to be executed by the integrated circuit chip;
    obtaining information on the type of the integrated circuit chip;
    generating a command corresponding to the type of the integrated circuit chip wherein the generated command is one command from a plurality of commands, wherein the command corresponds to the type of the integrated circuit chip, and wherein the plurality of commands correspond to different types of integrated circuit chips, based on the type of the integrated circuit chip obtained in the obtaining step, wherein generating the command includes encrypting the command from the generating step using encryption corresponding to the integrated circuit chip;

transmitting the command that has been encrypted to the server; and transmitting the generated command to the cellular phone via a mobile communication network.

6. A computer program stored on a computer readable medium, for enabling a computer to for managing an integrated circuit chip and for generating a command in response to a request from a server to transmit a command to the integrated circuit chip, the program comprising instructions to cause a computer to perform operations comprising:

managing a type of integrated circuit chip;

obtaining information on the type of the integrated circuit chip;

generating a command corresponding to the type of the integrated circuit chip, wherein the generated command is one command from a plurality of commands, wherein the command corresponds to the type of the integrated circuit chip, and wherein the plurality of commands correspond to different types of integrated circuit chips, wherein generating the command includes encrypting the command from the generating step using encryption corresponding to the integrated circuit chip;

transmitting the command that has been encrypted to the server; and transmitting the generated command to a cellular phone via a mobile communication network.

7. An information management apparatus for generating a command in response to a request, from a server, the command corresponding to a type of integrated circuit chip, the information management apparatus comprising:

a management unit for managing a type of integrated circuit chip, the type of integrated circuit chip corresponding to the generated command;

an obtaining section configured to indicate the type of the integrated circuit chip wherein the type of the integrated circuit chip is obtained by the obtaining section, and the generated command is one command from a plurality of commands, wherein the command corresponds to the type of the integrated circuit chip, and wherein the plurality of commands correspond to different types of integrated circuit chips; and a command generator configured to generate a command corresponding to the type of the integrated circuit chip and for transmitting the generated command to the server wherein the generated command is encrypted by the command generator prior to transmitting the generated command to the server, using encryption corresponding to the integrated circuit chip and transmitted to a cellular phone via a mobile communication network.

8. The information management apparatus of claim 1, wherein the means for obtaining information indicating the type of the integrated circuit chip obtains information including a secure chip operating system (OS) type and a version information of software for processing the generated command.

9. The information management method of claim 5, wherein obtaining information on the type of the integrated circuit chip, includes obtaining information including a secure chip operating system (OS) type and version information of software for processing the generated command.

10. The computer program stored on a computer readable medium of claim 6, wherein obtaining information on the type of the integrated circuit chip, includes obtaining information including a secure chip operating system (OS) type and a version information of software for processing the generated command.

11. The information management apparatus of claim 7, wherein the obtaining section is configured to identify the secure chip OS type and a version information of software for processing the generated command.

12. The information management apparatus according to claim 1, wherein the server and the information management apparatus are both resident on the same computing device.

13. The information management apparatus according to claim 7, wherein the server and the information management apparatus are both resident on the same computing device.

* * * * *